United States Patent [19]

Campanella et al.

[11] 3,725,612

[45] Apr. 3, 1973

[54] ECHO SUPPRESSOR BREAK-IN CIRCUIT

[75] Inventors: Samuel Joseph Campanella, Gaithersburg; Henri George Suyderhoud, Potomac; Michael Onufry, Jr., Gaithersburg, all of Md.

[73] Assignee: Communications Satellite Corporation, Washington, D.C.

[22] Filed: May 14, 1971

[21] Appl. No.: 143,370

[52] U.S. Cl. ....................179/170.6

[51] Int. Cl. ....................H04b 3/20

[58] Field of Search..............179/170.2, 170.6, 170.8

[56] References Cited

UNITED STATES PATENTS

| | | | |
|---|---|---|---|
| 2,825,764 | 3/1958 | Edwards | 179/170.2 |
| 3,280,274 | 10/1966 | Schoeffler | 179/170.2 |
| 3,560,669 | 2/1971 | Foulkes | 179/170.2 |
| 3,351,720 | 11/1967 | Brady | 179/170.2 |
| 3,313,893 | 4/1967 | Helder | 179/170.6 |

*Primary Examiner*—Kathleen H. Claffy
*Assistant Examiner*—David L. Stewart
*Attorney*—Martin C. Fliesler

[57] ABSTRACT

Split, switching type echo suppressors with break-in circuitry having dual control of the two break-in switches. At break-in each break-in switch is independently and simultaneously operated for the break-in state. After cessation of break-in each break-in switch is maintained for different hangover periods before reverting to the non-break-in state.

5 Claims, 2 Drawing Figures

INVENTORS
SAMUEL J. CAMPANELLA
HENRI G. SUYDERHOUD
MICHAEL ONUFRY, JR.

BY [signature]
ATTORNEYS

ECHO SUPPRESSOR BREAK-IN CIRCUIT

BACKGROUND OF THE INVENTION

1. Field of the Invention

This invention relates generally to echo suppressors and more particularly to echo suppressors having break-in circuitry.

2. Description of the Prior Art

In many communications systems it is the usual practice to interconnect two-wire local lines, at a terminal, to four-wire lines via a hybrid or other isolation network. The mixed system is particularly common in communications facilities such as radio relay circuits. The four-wire system provides separate one-way paths for transmission and reception of signal energy between terminals while the two-wire local circuit provides a single two-way path between the terminal and the subscriber. When signal energy is transmitted from a two-wire line and reaches the distant hybrid over one of the paths of the four-wire circuit a part of that signal returns over the other path of the four-wire circuit and is called echo. Echo is generated because the hybrid or other isolation network employed is never a perfect isolator.

When the round-trip delay of the four-wire transmission circuit is small echo will present little or no problem. However, certain transmission systems, such as those employing a stationary orbit earth satellite as a repeater station, or a transmission system utilizing long lines for the transmission of signal energy, can cause overall time delays of as much as 600 milliseconds. Under these circumstances failure to provide for attenuation of the echo leads to subscriber dissatisfaction since the subscriber will hear his own speech delayed by 600 milliseconds and will perceive this as a very disconcerting echo.

In the past, echo suppressors have been used to provide a partial solution to the echo problem. For example, split, switching-type echo suppressors have been used to reduce the echo; each suppressor being located near the terminals on the four-wire side of the communications facility. When a far-end talker begins to speak his signal is detected at the echo suppressor of the nearend talker by a voice detector. Upon detection of the far-end talker's speech by the voice detector an echo suppression switch on the echo return path is opened thereby disabling the echo return path and preventing the echo from returning to the far-end talker.

Break-in circuitry is also provided should the near-end talker desire to talk while the far-end talker is talking. In this latter condition a first break-in switch, in parallel with the echo suppression switch, is closed in response to a signal from a voice comparator. The voice comparator compares the signal being received by the near-end talker and the signal being transmitted by the near-end talker. When the signal amplitude of the latter is greater than or equal to the signal amplitude of the former, in response to a signal from the voice comparator, the break-in switch overrides the echo suppression switch and enables the return path. A second break-in switch located on the receive side of the four-wire path of the near-end talker is simultaneously opened in response to the signal from the voice comparator. The opening of the second break-in switch places a loss pad (in parallel with the second break-in switch) in this receive path. The loss pad attenuates the echo of the near-end talker and the signal of the far-end talker. After the near-end talker has ceased speaking the break-in switches are simultaneously operated a predetermined period after cessation of the speech to revert to the non-break-in state. This predetermined period, known as the hangover time period, is between 150 to 340 milliseconds.

The actual hangover period used is a compromise between "chopping" due to a short hangover time and excessive echo due to a long hangover time. If a short hangover time period is used, the break-in circuit will release during pauses in speech of the near-end talker. The far-end talker may then operate the echo suppression switch thereby "chopping" speech of the near-end talker before the operation of the break-in switches when the latter commences speech again. If a long hangover period is used "chopping" will be avoided but during the long hangover period echo will return to the far-end talker.

A disadvantage with these devices is that echo can return to the near-end talker after cessation of break-in by the near-end talker. For example, if the near-end talker ceases to speak at a time such that his last speech burst reaches the echo suppressor of the farend talker just prior to the cessation of speech of the far-end talker then, due to the hangover time periods (150 – 340 msecs) of the break-in switches of the far-end talker, the near-end talkers speech will be returned as echo over the closed path provided by the first break-in switch previously mentioned located at the far-end talker. Because the overall time delay for the speech signal of the near-end talker to return as echo is approximately 600 milliseconds and the hangover time period of the near-end talker's break-in switches are also 150 – 340 msecs the echo of the near-end talker will not be attenuated by the receive path loss pad. The echo will be received over the path provided by the second break-in switch mentioned above which is now closed or in its non-break-in state. The present invention has the advantage of effectively suppressing echo under this condition.

BRIEF SUMMARY OF THE INVENTION

The above advantage is accomplished by dual control of the hangover time period of the two break-in switches. When a near-end talker desires to break-in to the speech of the far-end talker, the speech of the near-end talker is compared in a voice comparator with the speech signal being received from the far-end talker. If the amplitude of the speech of the near-end talker is greater than or equal to the amplitude of the speech of the far-end talker the voice comparator emits a signal which is fed to two switch controls. One switch control operates to close the first break-in switch in parallel with the echo suppression switch thereby enabling a send path for the near-end talker. Simultaneously the second switch control opens the second break-in switch, in parallel with a receive loss pad, thereby placing the receive loss pad in the return path at the near-end talker. Following the cessation of break-in by the near-end talker the first switch control operates to open its respective break-in switch after a hangover period of 150 – 340 msecs. The second switch control operates its respective break-in switch such that its hangover time period is approximately 600 milliseconds. Dual control of the break-in switches is also provided at the echo suppressor of the far-end talker.

DETAILED DESCRIPTION OF THE DRAWINGS

Figure 1:
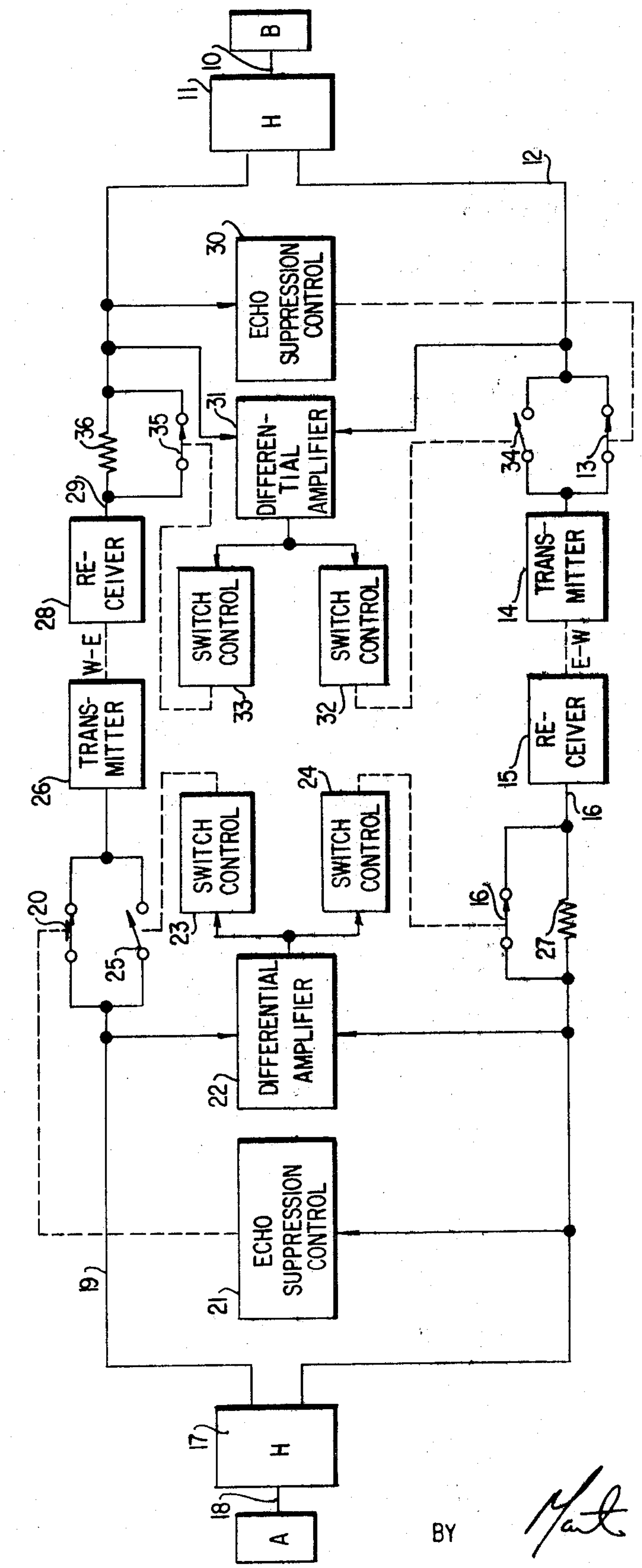
FIG. 1 is a block diagram of a communication facility including two-wire and four-wire sections and embodying split, switching type echo suppressors with break-in circuitry.

Referring to FIG. 1 there is shown a block diagram of a two-wire to four-wire communication facility having split, switching type echo suppressors located at each respective terminal East and West. Assuming the East subscriber B commences speech his signal will be transmitted via two-wire transmission line 10 to hybrid 11. Hybrid 11, as is well known, transfers the speech signal of subscriber B from the two-wire transmission line 10 to the send path 12 of the four-wire facility. The signal is then transmitted over normally closed echo suppression switch 13 to transmitter 14 where it is transmitted over East-West path E-W to a receiver. Transmission path E-W may include either a satellite relay or other radio relay facility.

The speech signal from subscriber B is then received at the receiver 15 of the West terminal. The signal is fed via receive path 16 and normally closed break-in switch 16 to hybrid 17. Hybrid 17, as is well known, transfers the speech signal from the receive path 16 of the four-wire facility to two-wire transmission line 18 and where it is ultimately received by subscriber A.

As is well known part of the received signal is transferred by hybrid 17 to send path 19 which would be returned to subscriber B as echo except for the operation of normally closed echo suppression switch 20. When subscriber B's speech signal is being received via receive path 16 the amplitude of the signal is detected by echo suppression control 21. Echo suppression control 21 is a speech detector well known in the art. In response to a threshold signal amplitude, echo suppression control 21 opens echo suppression switch 20 thereby disabling the return path 19 and preventing echo from returning to the subscriber B.

Break-in means are provided at the echo suppressor of the near-end talker, referred to herein as subscriber A, to enable subscriber A to break in to the conversation of far-end talker subscriber B. When subscriber A desires to break in to the speech of subscriber B, subscriber A's speech signal is transmitted via two-wire path 18 to hybrid 17. Hybrid 17, in a manner heretofore described with respect to hybrid 11, transfers the speech signal of subscriber A to send path 19. The speech signal from subscriber A is then fed to differential amplifier 22, well known in the art, where it is compared with the receive signal from subscriber B. If the amplitude of the signal from subscriber A is greater than or equal to the amplitude of the receive signal from subscriber B, differential amplifier 22 generates a control pulse which simultaneously controls switch controls 23 and 24. Switch control 23 operates to close normally open break-in switch 25 to override echo suppression switch 20 and enable the send path 19 for transmission of subscriber A's speech signal by transmitter 26. Switch control 24 simultaneously opens normally closed break-in switch 16 which places loss pad 27 in the return path 16.

Subscriber A's speech signal, which is transmitted via the West to East path W-E over the same satellite or other relay network, is received at the East terminal by receiver 28 and is then fed over the receive path 29 of the four-wire transmission facility to hybrid 11. Upon detection of subscriber A's speech signal echo suppressor control 30, in the manner heretofore discussed with respect to echo suppressor control 21, operates to open echo suppression switch 13 thereby disabling the send path 12. However, since subscriber B is also talking his echo suppressor will now operate in the break-in mode. That is, in the manner discussed with respect to break in by subscriber A, in response to a pulse from differential amplifier 31, switch controls 32 and 33 will, respectively, close normally opened break-in switch 34 thereby overriding echo suppression switch 13 and open normally closed switch 35 which will then place loss pad 36 in return path 29.

While one subscriber is talking it can therefore be seen how echo resulting from his speech signal will be suppressed by the activation of an echo suppression switch located at the echo suppressor of the other subscriber. While both subscribers A and B are talking, echo will not be suppressed due to the activation of the respective break-in switches 25, 34 in the echo suppressors associated with each respective subscriber A, B. The echos will be diminished due to the insertion of the respective loss pads 27, 36 and masked, as well, by the reception of the other subscriber's speech. However, a problem arises during break-in when one subscriber has ceased to speak prior to the other subscriber ceasing to speak. In prior systems this would result in the reception of each without the diminishing effect provided by the near-end loss pad by the subscriber who has ceased to speak first as will now be discussed.

Assume that subscriber A ceases to speak at a time such that subscriber A's last burst appears at the echo suppressor of subscriber B just prior to subscriber B ceasing to speak. When subscriber B ceases to speak the hangover time before break-in switches 34 and 35 revert to their rest or non-break-in state is 150 – 340 milliseconds. Due to this hangover time period subscriber A's last speech burst will travel via return path 29 over loss pad 36 to hybrid 11 and then as echo over send path 12 through break-in switch 34 which has not as yet been opened. The echo of subscriber A's speech signal will then travel via the East to West path E-W to the receive path 16. This overall delay in the transmission facility is about 600 msecs for a single satellite relay or other long distance radio relay circuit. Since the hangover time period provided by break-in switch control 24 located at the subscriber A echo suppressor is also only 150–340 msecs, break-in switch 16 will be in its rest or closed position when the echo signal from subscriber A returns thereto. Accordingly, the echo will not be attenuated by the loss pad 27 but will be fed via hybrid 17 and two-way transmission line 18 to subscriber A.

To avoid the problem of echo after the cessation of speech by one party at a time just prior to the cessation of speech of the other party each respective switch control 24, 33 is independently controlled with respect to respective switch control 23, 32. That is, the hangover time period before switch controls 24, 33 operate their associated break-in switch is made equal to approximately 600 milliseconds whereas the hangover time period before switch controls 23, 32 operate their associated break-in switches is 150 – 340 milliseconds. In this manner, when A's echo signal is returned to him under the above condition, break-in switch 16 will continue to be opened and the echo will be attenuated by a loss pad 27 thereby reducing the level of echo that subscriber A will hear. In the same manner subscriber B's echo will be attenuated should he cease speaking prior to subscriber A ceasing to speak.

Figure 2:
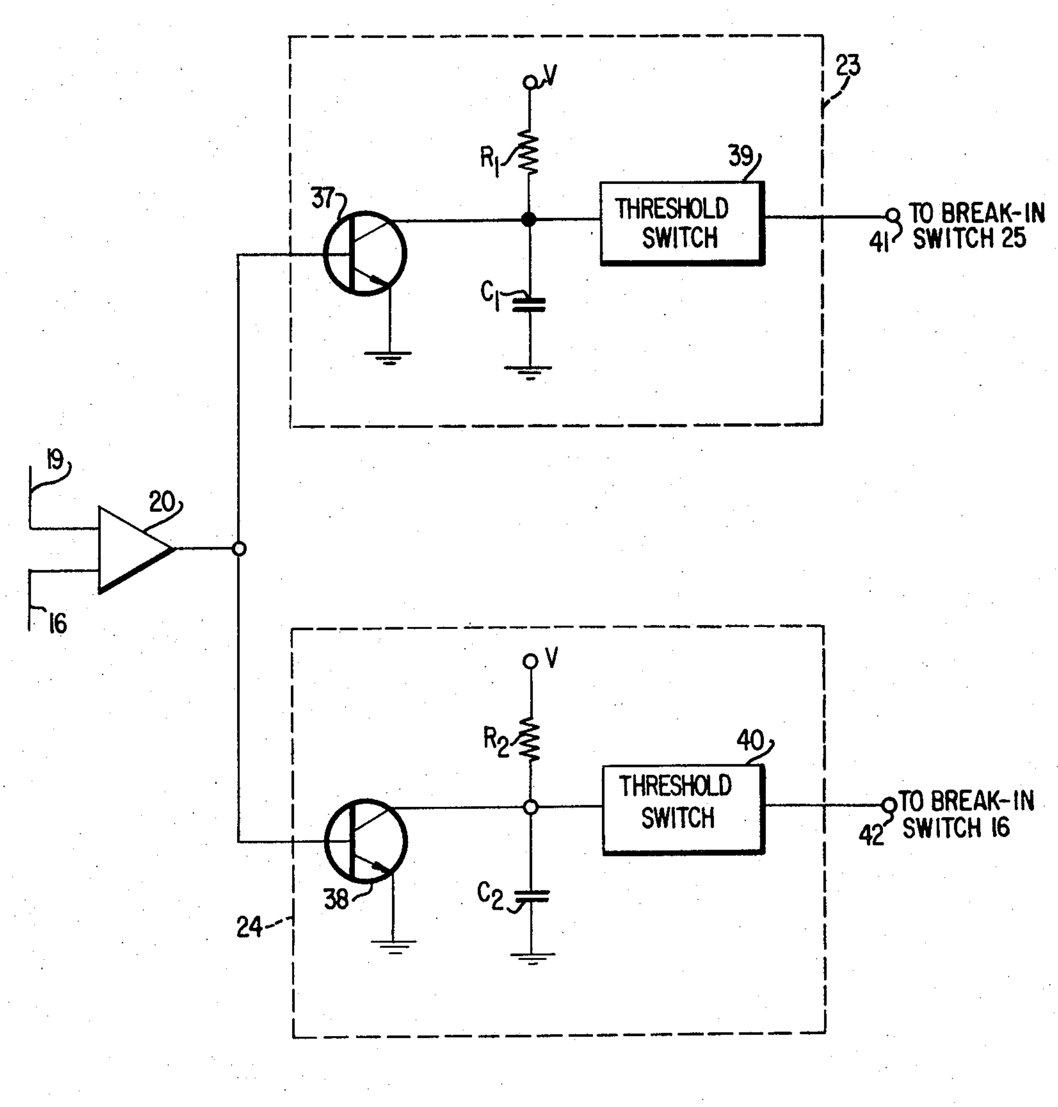
FIG. 2 is a schematic diagram of the dual control break-in circuitry used in the invention.

Referring to FIG. 2 there is shown the schematic diagram for the dual control break-in circuit of FIG. 1, located at the East terminal, comprising differential amplifier 22, switch controls 23 and 24 and their respective break-in switches 25 and 16. Differential amplifier 22 receives the input of speech energy from return path 16. When the amplitude of the speech signal from send path 19 is equal to or greater than the amplitude of the speech signal from return path 16 differential amplifier 22 generates a pulse which causes transistors 37 and 38 to become conductive. These transistor switches 37 and 38 discharge capacitors $C_1$ and $C_2$, respectively, when the amplitude of the signal from line 19 is greater than or equal to the amplitude of the signal on line 16. The voltage from capacitors $C_1$ and $C_2$ being greater than the threshold of threshold switches 39 and 40 causes threshold switches 39 and 40, respectively, to produce outputs on lines 41 and 42, respectively. The respective outputs on lines 41 and 42 then activate break-in switches 25 for echo suppression by-pass and 16 for receive loss pad insertion. This condition constitutes the break-in state of the echo suppressor. When the amplitude of the signal from line 19 once again becomes less than the amplitude of the signal from line 16 the output of differential amplifier 22 becomes such that transistor switches 37 and 38 become non-conductive. The voltage on capacitors $C_1$ and $C_2$, respectively, then rise exponentially at a rate determined by the time constants $R_1C_1$ and $R_2C_2$. When the voltage on the threshold switches 39 and 40, respectively, fall below the threshold, switches 39 and 40 revert to a state such that the signals on lines 41 and 42 deactivate break-in switches 25 and 16. The time constant $R_1C_1$ is adjusted so that this happens with a time delay of from 150 to 340 msecs for the control of break-in switch 25 and the time constant $R_2C_2$ is adjusted so that the time delay is set at 600 msecs. If the overall time delay of the transmission facility were longer, for example, 1200 msec due to a transmission path having two satellite links, then the time constant $R_2C_2$ would be set for 1200 msecs. Dual control circuitry of the type described would be the same for the echo suppressor located at subscriber B.

What is claimed is:

1. In a communication system having a pair of terminals, each terminal having means for interconnecting a two wire circuit with a four-wire transmission facility, an improved echo suppressor apparatus including means for detecting incoming speech on the receive side of said terminal, first switch means responsive to said incoming speech detecting means for disconnecting the send side of said terminal, means for detecting the presence of outgoing speech at said terminal while said incoming speech is present at said terminal, second switch means responsive to said means for detecting the presence of outgoing speech for reconnecting the send side of said terminal and means responsive to the detection of said outgoing speech for attenuating said incoming speech, wherein the improvement comprises:

a. third switch means responsive to said means for detecting the presence of outgoing speech for disconnecting the send side of said terminal a first predetermined time interval after said outgoing speech has ceased; and b. fourth switch means responsive to said sensing means for removing said attenuation means from said incoming signals a second predetermined time interval after said outgoing speech has ceased said second time interval being independent of said first time interval.

2. The apparatus of claim 1 wherein said third switch means includes an RC time circuit wherein said first predetermined time period is determined by a first constant $R_1C_1$ and said fourth switch means includes a second RC time circuit wherein said second predetermined time period is determined by a second constant $R_2C_2$.

3. The apparatus of claim 2 wherein said second predetermined time interval is equal to the overall time delay of speech in the four wire transmission facility.

4. The apparatus of claim 3 wherein said means for sensing the presence of outgoing speech comprises a differential amplifier, and said second switch means comprises a second switch in parallel with said first switch means and second switch control means responsive to said differential amplifier for causing said second switch to bypass said first switch means upon detection of the presence of outgoing speech by said differential amplifier and causing said second switch to open-circuit upon detection of the cessation of outgoing speech by said differential amplifier.

5. The apparatus of claim 4 wherein said means for attenuating comprises a loss pad in the receive side of said terminal and said fourth switch means comprise a fourth switch in parallel with said loss pad and fourth switch control means responsive to said differential amplifier for inserting said loss pad into the receive side of said terminal upon detection of the presence of outgoing speech by said differential amplifier and bypassing said loss pad upon the detection of the cessation of outgoing speech by said differential amplifier.

* * * * *